United States Patent [19]

Köhler et al.

[11] Patent Number: 5,698,622
[45] Date of Patent: Dec. 16, 1997

[54] STABILISATION OF ABS GRAFT POLYMERS USING DITHIODIPROPIONIC ACID

[75] Inventors: Burkhard Köhler, Leverkusen; Werner Tischer, Dormagen, both of Germany

[73] Assignee: Bayer AG, Leverkusen, Germany

[21] Appl. No.: 811,496

[22] Filed: Mar. 5, 1997

[30] Foreign Application Priority Data

Mar. 14, 1996 [DE] Germany .................. 19610787.3
Aug. 14, 1996 [DE] Germany .................. 19632701.6

[51] Int. Cl.⁶ .................................................. C08K 5/36
[52] U.S. Cl. .................................. 524/304; 524/303
[58] Field of Search ........................ 524/303, 304, 524/305

[56] References Cited

U.S. PATENT DOCUMENTS

| | | | |
|---|---|---|---|
| 2,669,507 | 2/1954 | Young | 524/303 |
| 2,981,717 | 4/1961 | Boultbee | 524/303 |
| 3,277,044 | 10/1966 | Weissermel et al. | 524/303 |
| 4,028,332 | 6/1977 | Needham et al. | 524/303 |
| 4,513,123 | 4/1985 | Day et al. | 525/332.6 |
| 4,595,721 | 6/1986 | Devaux et al. | 524/303 |
| 5,328,949 | 7/1994 | Sandstrom et al. | 524/305 |
| 5,336,730 | 8/1994 | Sandstorm et al. | 524/304 |
| 5,420,181 | 5/1995 | Eichenauer et al. | 524/303 |

*Primary Examiner*—Veronica P. Hoke
*Attorney, Agent, or Firm*—Connolly & Hutz

[57] ABSTRACT

The invention relates to mixtures of ABS graft polymers, sterically hindered phenols and dithiodipropionic acid.

3 Claims, No Drawings

STABILISATION OF ABS GRAFT POLYMERS USING DITHIODIPROPIONIC ACID

The invention relates to mixtures of ABS graft polymers, sterically hindered phenols and dithiodipropionic acid.

The stabilisation against oxidation of ABS graft polymers by means of synergistic mixtures of sterically hindered phenols and diesters of dithiodipropionic acid which acid can also be named bis (2-carboxyethyl) disulphide is known (U.S. Pat. No. 4,028,332, R. Gächter, H. Müller (Ed.): Taschenbuch der Kunststoff-Additive, 3rd Edition, Hanser Verlag, Munich, 1989, page 31; 42–49; 77–85). Carboxyfunctional stabilisers are not described for this use. Carboxylic acid groups are presented only in the form of their derivatives, as ester, amide or hydrazide, as hitherto it has been assumed that the compatibility with the polymer matrix to be protected is better as a result of the derivatisation.

The use of salts of dithiodipropionic acid as additives for lubricants employed at high pressures is known (EP-A 400 945, EP-A 288 375).

The stabilising action of barium salts of dithiodipropionic acid in styrene resins containing halogen compounds is also known (JP-A 53 134 049).

The use of dithiodipropionic acid for improving the bonding of $SiO_2$ to rubbers has also been described (U.S. Pat. No. 5,328,949).

It has now been found that ABS compounds which contain as stabiliser a combination of dithiodipropionic acid and conventional sterically hindered phenols exhibit a distinctly improved stability to UV radiation as compared with prior art, and in particular compared with polymers stabilised using diesters of dithiodipropionic acid.

The invention accordingly provides mixtures of

A) from 98 to 99.8 parts by weight of ABS graff polymer,
B) from 0.1 to 1 parts by weight of sterically hindered phenols,
c) from 0.1 to 1 parts by weight of dithiodipropionic acid and
D) optionally, referred to 100 parts by weight of the mixture A)+B)+C), from 10 to 1,000 parts by weight, preferably from 50 to 500 parts by weight, of polycarbonate.

ABS graft polymers A) for the purpose of the invention consist of

A1) from 0 to 90 parts by weight, preferably from 10 to 80 parts by weight, and particularly preferably from 20 to 75 parts by weight, of one or more thermoplastic homopolymers, copolymers or terpolymers of polymerised vinyl monomers, selected from styrene, α-methylstyrene, ring-substituted styrene, methyl methacrylate, acrylonitrile, methacrylonitrile, maleic anhydride, N-substituted maleimide, vinyl acetate and mixtures thereof and A2) from 10 to 100 parts by weight, preferably from 90 to 20 parts by weight and particularly preferably from 25 to 80 parts by weight of one or more graft products made from A2.1 from 5 to 90 parts by weight, preferably from 30 to 80 parts by weight, of styrene, α-methylstyrene, ring-substituted styrene, methyl methacrylate, acrylonitrile, methacrylonitrile, maleic anhydride, N-substituted maleimide, vinyl acetate or mixtures thereof on A2.2 from 95 to 10 parts by weight, preferably from 70 to 20 parts by weight of a rubber having a glass temperature of $\leq 10°$ C.

The products A1) and A2) are known and are further described, for example, in DE-OS 38 08 844.

Preferred graft products for the purpose of the invention are graft products of styrene and acrylonitrile on polybutadiene, with from 50 to 90 wt. % of styrene and from 10 to 50 wt. % of acrylonitrile generally being present in the mixture of the graft polymers. The graft products generally contain from 10 to 30 wt. % of polybutadiene in the form of small particles. The polybutadiene is generally cross-linked. These graft products can be obtained by polymerisation of styrene and acrylonitrile in the presence of a polybutadiene latex. The graft product is generally already a mixture of free styrene-acrylonitrile copolymer and rubber particles, onto which styrene and acrylonitrile is graft-polymerised. The rubber content of this product can be adjusted to the required amount by the addition of separately prepared styrene-acrylonitrile copolymer.

ABS graft copolymers are known, as are also methods for their preparation (for example, emulsion polymerisation, bulk polymerisation, suspension polymerisation, precipitation polymerisation or combinations of these methods). A summary may be found in Ullmann's Encyclopedia of industrial Chemistry, 5th Ed., Vol. A21, pages 633 ff.

The ABS graff polymer may contain up to 15 wt. % of other organic constituents, for example, nitrile rubbers, acid-functional nitrile rubbers, silicones, polyether silicones, polyethylene wax, esters or amides of $C_{12}$–$C_{22}$ carboxylic acids, phosphites or phosphates of phenols or alcohols, or polytetrafluoroethylene.

Sterically hindered phenols (B) are known in principle. Examples may be found in R. Gächter, H. Müller (Ed.): Taschenbuch der Kunststoff-Additive, 3rd Edition, Hanser Verlag, Munich, 1989, page 31; 42–49, a summary in T. J. Henman: World Index of Polyolefin Stabilizers, Kogan Page, London 1982. Examples which may be mentioned are BHT (3,5-di-tert. butyl-4-hydroxytoluene), octadecyl-3-(3, 5-di-tert. butyl-4-hydroxyphenyl) propionate, pentaerythritol tetrakis-3-(3,5-di-tert. butyl-4-hydroxyphenyl) propionate, triethylene glycol bis-3-(3-tert. butyl-4-hydroxy-5-methylphenyl) propionate, 1,6-hexamethylenebis-3-(3,5-di-tert. butyl-4-hydroxyphenyl) propionate and 2,2'-methhylenebis(4-methyl-6-cyclohexylphenol).

Thermoplastic polycarbonates D) may be either homopolycarbonates or copolycarbonates of the diphenols corresponding to formula (I),

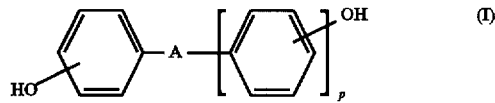

wherein p is 1 or zero and

A may be a single bond, $C_1$–$C_5$ alkylene, $C_2$–$C_5$ alkylidene, $C_5$–$C_6$ cycloalkylidene optionally substituted by methyl groups, —O—, —S— and —$SO_2$.

The polycarbonates of component D) may be either linear or branched, they may contain aromatically bonded methyl groups and are free from halogen. The polycarbonates of component A) may be used individually or as a mixture.

The diphenols of formula (I) are either known in the literature or can be prepared by methods known in the literature. The preparation of the polycarbonates suitable according to the invention constituting component D) is likewise known in the literature and can be carried out, for example, by the phase interface method using phosgene or by the method in homogeneous phase (the so-called pyridine method) using phosgene, with the molecular weight to be established in each case being achieved in a known manner by an appropriate quantity of known chain terminators.

Suitable diphenols corresponding to formula (I) are, for example, hydroquinone, resorcinol, 4,4'-dihydroxydiphenyl, 2,2-bis(4-hydroxyphenyl)propane (bisphenol A), 2,4-bis(4-hydroxyphenyl)-2-methylbutane, 2,2-bis(4-hydroxy-3,5-dimethylphenyl)-propane, 1,1-bis(4-hydroxyphenyl) cyclohexane or 1,1-bis(4-hydroxyphenyl)-3,3,5-trimethylcyclohexane. Preferred diphenols corresponding to formula (I) are 2,2-bis(4-hydroxyphenyl)propane and 1,1-bis(4-hydroxyphenyl)-3,3,5-trimethylcyclohexane. Mixtures of diphenols may also be used, for example, composed of bisphenol A and up to 60 mol-% of 1,1-bis(4-hydroxyphenyl)-3,3,5-trimethylcyclohexane.

Examples of suitable chain terminators are phenol or p-tert. butylphenol, and also long-chain alkylphenols such as 4-(1,3-tetramethylbutyl)phenol in accordance with DE-OS 2 842 005 or monoalkylphenols or dialkylphenols having in total 8 to 20 C. atoms in the alkyl substituents in accordance with German Patent Application 3 506 472, such as, for example, p-nonylphenol, 2,5-di-tert. butylphenol, p-tert. octylphenol, p-dodecylphenol, 2-(3,5-dimethylheptyl) phenol and 4-(2,5-dimethylheptyl)phenol. The quantity of chain terminators to be used is generally between 0.5 and 10 mol-%, referred to the sum of the diphenols (I) used in each case.

The polycarbonates suitable according to the invention constituting component D) may be branched in a known manner, namely, preferably by the incorporation of from 0.05 to 2.0.mol-%, referred to the sum of the diphenols used, of trifunctional or more than trifunctional compounds, for example, those having three or more than three phenolic OH groups.

The polycarbonates suitable according to the invention have average weight average molecular weights $\overline{M}_w$, measured, for example, by ultracentrifugation or light-scattering measurement, of from 10,000 to 200,000, preferably from 20,000 to 80,000.

The components A), B), C) and optionally D) can be mixed in the melt in kneaders or extruders, at temperatures of from 180° to 280° C.

If the ABS graft polymer is prepared by emulsion polymerisation, then dithiodipropionic acid C) or alkali salts, alkaline earth salts, ammonium salts or alkylammonium salts of dithiodipropionic acid can be added to the latex of the graft copolymer and this is then coagulated. During the neutralisation or acidification taking place here, the dithiodipropionic acid accumulates in freely-divided form in the powder of the graft copolymer. The sterically hindered phenols B) can also be added to the latex of the graft copolymer. In these cases a mixing of the powder of the graft copolymer with other components optionally present, for example, SAN polymer, is subsequently carried out in the melt.

The mixtures according to the invention excel in having a very good resistance to weathering and particularly high stability towards UV radiation. They are suitable for the production of mouldings and semifinished products by extrusion or injection moulding. These parts find application in toys, domestic appliances, electrical or electronic appliances or in the automobile sector.

EXAMPLES

The ABS graft polymer A) used was a mixture consisting of 70 parts by weight of styrene-acrylonitrile copolymer containing 28 wt. % of acrylonitrile and having an intrinsic viscosity of 0.55 dl/g (DMF, 20° C.), 30 parts by weight of a graft polymer of 50 wt. % of styrene/acrylonitrile in the ratio of 72:28 on 50 wt. % of a polybutadiene rubber in the form of particles (bimodal distribution of the particle diameter with maxima at 100 nm and 400 nm), 2 parts by weight of an acid-functional nitrile rubber (Krynac X7.4, Bayer Corp.) having an acrylonitrile content of 28 wt. % and a fumaric acid content of 7 wt. %, and 1 part by weight of a block copolymer composed of polymethyldisiloxane with EO/PO polyether (VPAI 3468, Bayer AG).

Pentaerythritol tetrakis-3-(3,5-di-tert. butyl-4-hydroxyphenyl) propionate was used as the sterically hindered phenol B).

Comparative Example 1

The ABS graft polymer A was kneaded for 3 minutes at 200° C. Sample mouldings were then produced by injection moulding at 240° C.

Comparative Example 2

100 parts by weight of ABS graft polymer A) was mixed with 0.5 parts by weight of sterically hindered phenol B) and 0.5 parts by weight of dilauryl dithiodipropionate under the same conditions as in Comparative Example 1.

Comparative Example 3

By kneading for 3 minutes at 220° C., a mixture was prepared comprising:

9 parts by weight of a graft polymer of 45 wt. % of styrene/acrylonitrile in the ratio of 72:28 on 55 wt. % of a polybutadiene rubber in the form of particles (average particle diameter 400 nm), 10 parts by weight of styrene-acrylonitrile copolymer containing 28 wt. % of acrylonitrile and having an intrinsic viscosity of 0.55 dl/g (DMF, 20° C.), 81 parts by weight of bisphenol A polycarbonate having a relative solution viscosity of 1.26 (0.5% in methylene chloride, 25° C.), 4 parts by weight of tetrafluoroethylene polymer-graft mixture in the form of a coagulated mixture of 90 wt. % of a SAN graft polymer emulsion, consisting of a graft polymer of 45 wt. % of styrene and acrylonitrile in the weight ratio of 72:28 on 55 wt. % of cross-linked polybutadiene rubber in the form of particles (400 nm), imd 10 wt. % of tetrafluoroethylene polymer, 13 parts by weight of triphenyl phosphate and 0.5 parts by weight of pentaerythritol tetrastearate.

Example 1

100 parts by weight of ABS graft polymer A) was mixed with 0.5 parts by weight of sterically hindered phenol B) and 0.5 parts by weight of dithiodipropionic acid under the same conditions as in Comparative Example 1.

The colour deviation was measured after exposure to light for 72 hours in accordance with DIN 5033, DIN 6174 and DIN 6175 and the MVI was measured in accordance with ISO 1133.

|  | Colour deviation | MVI (Flow behaviour) |
|---|---|---|
| Comparison 1 | 5.66 | 40.6 |
| Comparison 2 | 3.61 | 42.8 |
| Example 1 | 2.45 | 44.2 |

The product obtained in Example 1 shows a distinct improvement in stability to UV radiation and in flow behaviour relative to the Comparative Examples.

Example 2

To the mixture described in Comparative Example 3 were also added 0.5 parts by weight of dithiodipropionic acid and 0.1 parts by weight of sterically hindered phenol.

The granular materials from Comparative Example 3 and Example 2 were injection-moulded at various temperatures at a cycle time of 75 seconds. The sample mouldings were exposed to light as in Example 1.

|  | Colour deviation at injection-moulding temperature | | |
|---|---|---|---|
|  | 250° C. | 270° C. | 290° C. |
| Comparison 3 | 7.38 | 8.07 | 9.17 |
| Example 2 | 1.71 | 2.39 | 3.07 |

The samples according to the invention in all cases show a distinctly better colour stability than do the reference samples.

We claim:

1. Mixtures of

A) from 98 to 99.8 parts by weight of acrylonitrile-butadiene-styrene polymer,

B) from 0.1 to 1 parts by weight of sterically hindered phenols,

C) from 0.1 to 1 parts by weight ditriodipropionic acid, and

D) optionally, referred to 100 parts by weight of the mixtures A)+B)+C), from 10 to 1,000 parts by weight of polycarbonate.

2. A method for preparing the mixtures according to claim 1, whereby components B) and C) are added to a latex of component A) which is then coagulated by the addition of acid.

3. The method for preparing mixtures according to claim 1, whereby component B) and salts of component C) are added to a latex of component A) which is then coagulated by the addition of acid.

* * * * *